Aug. 2, 1966    R. B. TYLER    3,264,505
DYNAMOELECTRIC MACHINE WINDING CONNECTION
Filed Sept. 5, 1963    2 Sheets-Sheet 1

INVENTOR.
Richard B. Tyler
BY
HIS ATTORNEY

INVENTOR.
Richard B. Tyler
BY
Albert H. Reuther
HIS ATTORNEY

United States Patent Office 3,264,505
Patented August 2, 1966

---

3,264,505
DYNAMOELECTRIC MACHINE WINDING CONNECTION
Richard B. Tyler, Downers Grove, Ill., assignor to General Motors Corporation, Detroit Mich., a corporation of Delaware
Filed Sept. 5, 1963, Ser. No. 306,818
2 Claims. (Cl. 310—183)

This invention relates to structural improvement on a dynamoelectric machine and more particularly, to a winding connection which is flexible to accommodate temperature variation under differing current-carrying conditions though maintaining necessary mechanical and electrical properties.

A problem of differential heating and expansion is encountered on rotors having continuous end ring interconnection and unitary configuration at opposite ends of peripherally-embedded axial conductor bars during differing operating conditions. For example, so-called amortisseur or squirrel-cage rotor starting windings can be used in combination with wound salient pole rotor structure. Such amortisseur conductor bars carry considerable current flow during starting and acceleration with torque and power consumption dependent upon losses in such conductor bars as well as end ring structure therewith. Further problems of maintaining proper cooling, low weight or mass of the rotor components, ease of manufacture and assembly of required parts as well as radial stiffness are in addition to the matter of differential heating and expansion.

An object of the present invention is to provide a winding connection which solves the foregoing problems though combining circumferential flexibility with radial stiffness.

Another object of this invention is to provide arcuately segmented end ring means joined at predetermined circumferential intervals by axially diverted though annularly extending connector means having maximum circumferential flexibility, maximum radial stiffness, maximum cooling and minimum weight consistent with conductivity required.

A further object of this invention is to provide in combination on the rotor of a wound salient pole electrical machine an amortisseur or starting winding including substantially axial conductor bars embedded peripherally in adjoining poles and having segmented curved end ring means attached thereto at opposite ends of the bars though in locations between poles there are curved connector means having circumferential flexibility and radial rigidity for supplementing and complementing segmented end ring means into a continuous annular configuration.

Another object of this invention is to provide an improvement on the rotor of a wound salient pole electrical machine fitted also with an amortisseur or squirrel-cage-type starting winding including substantially axial conductor bars embedded peripherally in each of adjoining poles for which opposite shorting end connections are made by segmented and peripherally curved end ring means that project only a predetermined distance beyond poles for arcuate completion by specific U-shaped pairs of peripherally flexible though radially rigid connector portions bowed axially away from each other in spacing between poles for effective cooling and turbulence in a location radially outwardly and remote from fan blade means also carried by the rotor.

Further objects and advantages of the present invention will be apparent from the following description, reference being had to the accompanying drawings wherein preferred embodiments of the present invention are clearly shown.

Figure 1:
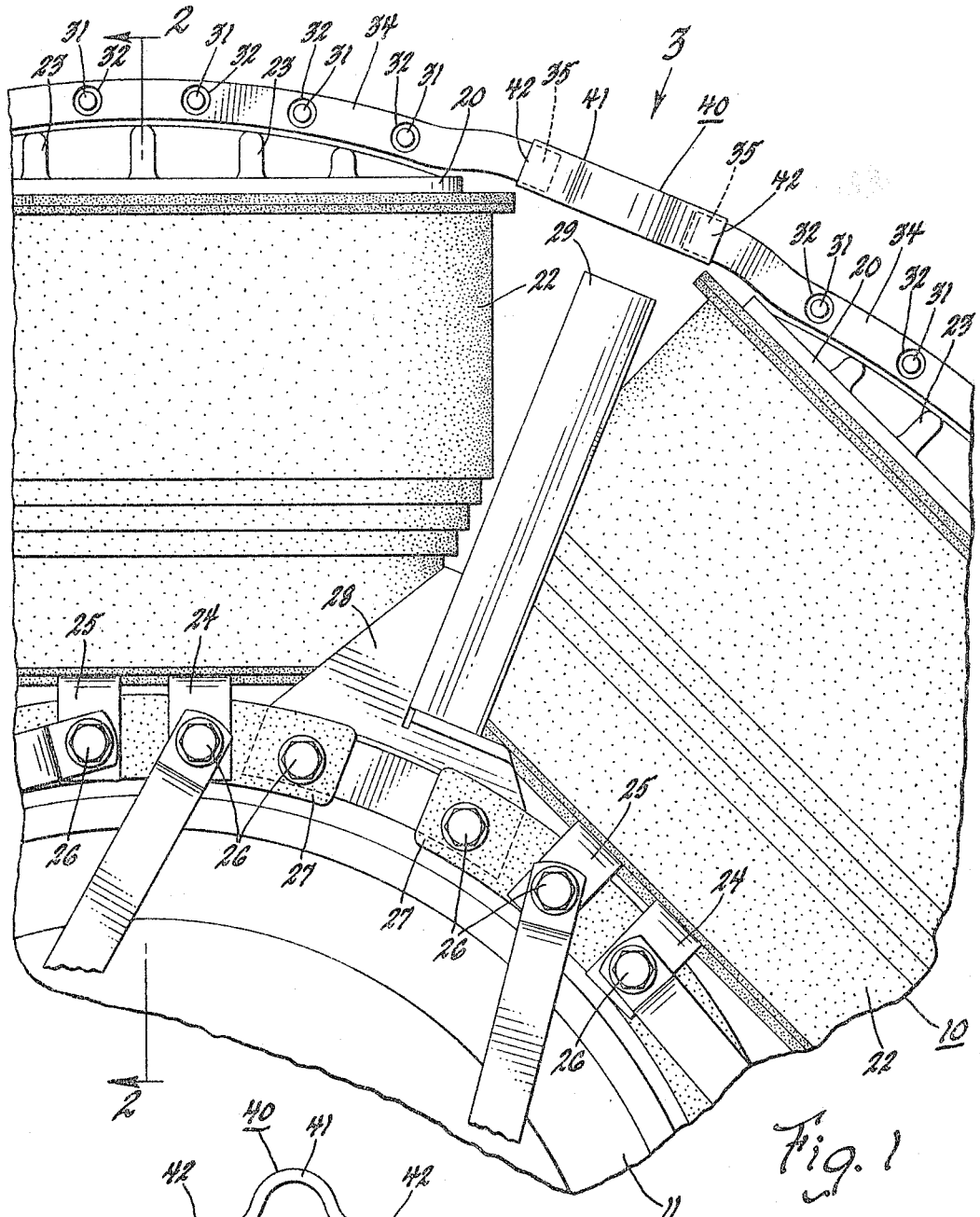
FIGURE 1 is a fragmentary end view of a dynamoelectric machine rotor winding connection having features in accordance with the present invention.

Provision of a starting winding on a rotor outer periphery can result in encountering of considerably more problems and conflict of structural relationships than on a wound stator location of an alternating current dynamoelectric machine. Since the present invention relates to structural improvement of rotor winding connections, the drawings illustrate only rotor structure though it is to be understood that well known stator components are to be used therewith including a housing and end frame bearing mounting for a rotating shaft also not illustrated. A rotor means generally indicated by numeral 10 in FIGURES 1 and 2 of the drawings can be suitably carried or mounted on such a shaft by use of a support or alternator spider subassembly 11. This spider subassembly 11 can extend peripherally around the centrally located shaft and can have radially outwardly extending openings 12 therethrough as shown in FIGURE 2. These openings 12 can receive sleeves or bushings 14 adjacent to an outer end thereof for alignment of subassembly 11 and laminations kept thereby in a non-shiftable position with a hollow core receiving fastening devices 15 having a threaded end 16 onto which a washer means 17 and nut 18 can be fitted radially inwardly thereof. These fastening devices 15 are insertable from an inside end of each pole and extend substantially radially of the rotor structure. Outer ends thereof terminate in a threaded juncture with transverse rod portions 19 for anchoring pole-forming pieces 20 having axial openings 21 therethrough in which the rod portions 19 terminate. Alternatively, such fastening devices could be bolts threaded in rod portion 19 and having a solid and integral head in place of nut 18. Suitable winding means 22 are fitted over and around the pole pieces 20 subject to provision of suitable insulation therebetween. The outer ends of pole pieces 20 can include integral axially located fins 23 for cooling purposes and the winding means 22 can have radially inwardly extending terminations 24 and 25 which can be secured by suitable fasteners 26 to an annular connecting means 27 having spacers 26a to one side thereof as shown in FIGURE 2. The fasteners or bolts 26 can also serve to hold a radial web portion 28 of fan blade means 29 as shown in views of FIGURES 1 and 2.

Salient poles on the rotor means 10 further include a laminated core 30 of magnetic material such as steel fitted around and anchored by the rod portions 19. Adjacent to an outer peripheral edge of these laminations there can be substantially axial passages in a well known manner fitted with conductor bars 31 of suitable material such as copper, bronze or copper-clad steel. Opposite axial end of these conductor bars 31 can be suitably secured by a brazing, soldering or a welding operation along annular portions 32 into a mechanical and electrical juncture with curved though segmented end ring means 34. Such segmented end ring means can have opposite projections or ends 35 shown in FIGURES 1 and 3. These projections or ends 35 of the segmented end ring means 34 terminate in locations radially outwardly from fan blade means 29 and in between adjoining poles. The interrupted or poles segmented ring means 34 are subjected to considerable differences in temperature particularly in starting operation when heavier current flow occurs therein. Thus circumferentially a solid or continuous end ring means as previously known would be subjected not only to considerable centrifugal force radially outwardly but also there would be considerable heating of such continuous end ring means resulting in expansion and radially outward displacement which could interfere with air gap clearance between the rotor and stator components of a dynamoelectric machine.

Figure 3:
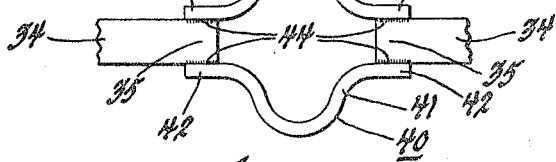
FIGURE 3 is a plan view of connector means taken in the direction of arrows 3 in FIGURE 1.
Figure 2:
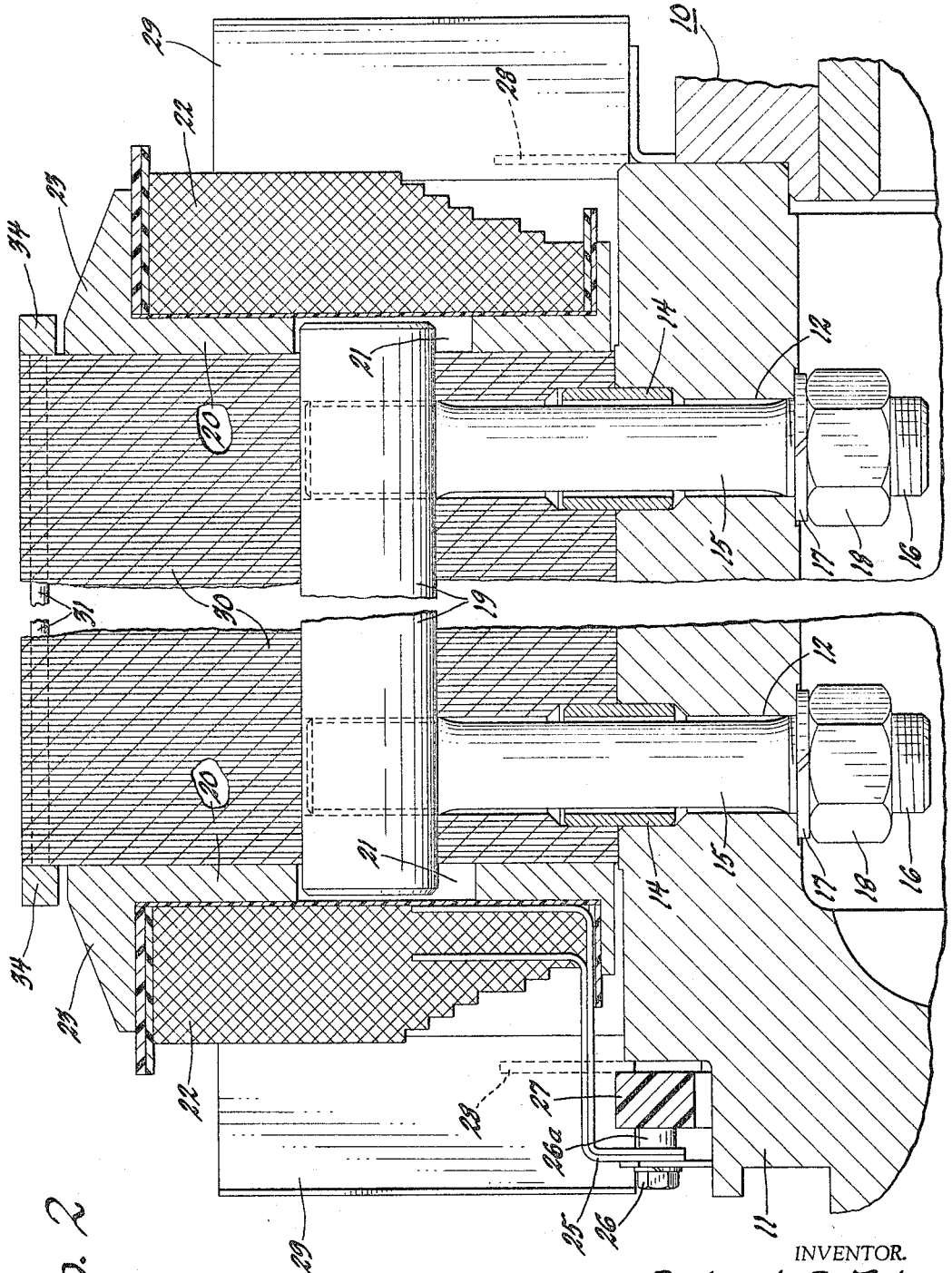
FIGURE 2 is a sectional view taken along line 2—2 in FIGURE 1.

In accordance with the present invention, the segmented end ring means 34 can expand and contract circumferentially without radial displacement due to provision of winding connection means generally indicated by numeral 40 in views of FIGURES 1 and 3. This winding connection means 40 includes a curved or substantially U-shaped body portion 41 terminating in opposite ends 42 which can be joined to the projections 35 of the segmented end ring means 34 as shown in FIGURES 1 and 3. The curved or bowed body portions 41 provide flexibility in a circumferential direction yet supplement and complement the segmented end ring means 34 to assure radial stiffness and rigidity. Location of the curved or bowed body portion 41 in between the poles assures adequate spacing for efficient cooling. The curved or bowed wavy configuration of the body portions 41 of the winding connection means can effect further turbulence also for cooling in locations aligned radially outwardly from fan blade means 29 as can be seen in FIGURE 1. Provision of the winding connection means 40 between each of opposite segmented end ring means 34 can form a fully connected squirrel cage winding on the rotor of a salient pole electrical machine for use thereof as a starting or amortisseur winding in adjoining poles.

The ends or projections 35 of the segmented end ring means 34 can be joined by brazing, soldering, or welding along junctures 44 illustrated in FIGURE 3. However, it is to be noted that for some installations where servicing and access to components is particularly desirable, such connection between the projections 35 and ends 42 may be made by bolting or other suitable fastening methods providing necessary mechanical and electrical properties. The components as shown for the present invention are readily manufactured and assembled with a minimum of weight particularly in the winding connection means 40 between segmented though curved end ring means 34. Good cooling is possible in the spacing between the adjoining poles though the end ring means 34 as segmented and joined by winding connection means 40 are in a location radially outwardly and remote from the fan blade means 29.

The bowed or curved body portions 41 of the winding connection means 40 can extend axially away from each other as illustrated in FIGURE 3 so that in effect a multipart or paired connecting strap provides maximum circumferential flexibility, maximum radial stiffness, maximum cooling and minimum weight consistent with conductivity required. Interconnection of the segmented end ring means 34 is facilitated by having projections or ends 35 thereof extend slightly towards and adjacent pole with actual interconnection being accomplished by the winding connection means 40. At least one or more U-shaped body portions consisting of one or more pieces depending upon conductivity required can be provided on each of opposite side surfaces of the projecting ends of the segmented end ring means 34. The curved or wavy body portion 41 is adapted to provide both mechanical strength and thermal capacity to withstand force of expansion and contraction as well as of the mass thereof including the opposite ends of the conductor bars 31. Thus, even if such conductor bars 31 become unevenly heated and thus change in size to apply forces of tension or compression as to the end ring means segments 34 there is both circumferential and axial flexibility in the body portions 41 of the winding connector means 40 sufficient for operation under low as well as high torque and inertia applications. In effect the winding connector means 40 provide both electrical joining as well as end ring cooling circumferentially thereof. It is to be understood that the winding connection means 40 can be provided on rotor means having single as well as multi-cage winding structure.

Features of the present invention can be applied to synchronous alternating current motor means of varying sizes. Various industrial uses can be made of such alternating current machines usable alone or in combination with direct current generators which in turn can drive direct current traction motors.

While the embodiments of the present invention as herein disclosed constitute preferred forms, it is to be understood that other forms might be adopted.

What is claimed is as follows:

1. On a rotor of a wound salient pole electrical machine fitted also with a squirrel-cage-type winding including substantially axial conductor bars embedded peripherally in each of adjoining poles though opposite ends of the conductor bars have segmented and peripherally curved end ring means secured thereto having projection only a predetermined distance beyond poles, the improvement therewith which comprises an identical pair of radially adjacent though axially spaced U-shaped body portions secured to each projection and extending to a peripherally adjoining projection of segmented end ring means of an adjacent pole, each pair of said U-shaped body portions having radially open space therebetween that facilitates cooling which is also enhanced by turbulence due to axially opposite though symmetrically extending U-shaped body portions definitely located away from each other and rigid radially for stiffness though each having periphery rigidly within predetermined radial limit yet circumferentially flexible in addition to axially separated and opposite bowed configuration between adjacent poles for cooling turbulence and radially outward opening therebetween which permits such radially open cooling and laterally opposite axial accommodation of expansion and contraction due to temperature variation under starting and running operating conditions.

2. On a rotor of a wound salient pole electrical machine fitted also with a squirrel-cage-type winding including substantially axial conductor bars embedded peripherally in each of adjoining poles though opposite ends of the conductor bars have segmented and peripherally curved end ring means secured thereto having projection only a predetermined distance beyond poles, the combination therewith comprising fan blade means located between adjacent poles and extending radially outwardly for a distance less than axially intermediate projections of the end ring means of adjacent poles, and an identical pair of radially adjacent though axially spaced U-shaped body portions secured to each projection and extending to a peripherally adjacent projection of segmented end ring means of an adjacent pole, each pair of said U-shaped body portions having radially open space therebetween for effective cooling due to turbulence of axially oppositely extending U-shaped body portions as well as due to turbulence of said radially intermediate fan blade means, said identical pair of U-shaped body portions being located for maximum cooling with minimum weight radially outwardly from said fan blade means though said pair of U-shaped body portions is radially rigid due to radial positioning thereof yet circumferentially flexible as axially diverted in opposite axial directions in between pole locations between which end ring conductivity is established thereby subject to axial rather than radial flexibility of each pair of said U-shaped body portions.

References Cited by the Examiner

UNITED STATES PATENTS

| | | | |
|---|---|---|---|
| 1,208,460 | 12/1916 | Bisbee | 310—183 |
| 2,456,983 | 12/1948 | Morse | 310—183 |

FOREIGN PATENTS 100,561   8/1923   Switzerland.

MILTON O. HIRSHFIELD, *Primary Examiner.*
ORIS L. RADAR, *Examiner.*
J. J. SWARTZ, *Assistant Examiner.*